(12) United States Patent
He et al.

(10) Patent No.: US 8,372,484 B2
(45) Date of Patent: Feb. 12, 2013

(54) ANTI-FROST COATING AND THE APPLICATION METHOD THEREOF

(75) Inventors: Min He, Beijing (CN); Yanlin Song, Beijing (CN); Biqian Liu, Beijing (CN)

(73) Assignee: Institute of Chemistry, Chinese Academy of Sciences, Beijing (CN)

( * ) Notice: Subject to any disclaimer, the term of this patent is extended or adjusted under 35 U.S.C. 154(b) by 245 days.

(21) Appl. No.: 12/864,607

(22) PCT Filed: Jan. 21, 2009

(86) PCT No.: PCT/CN2009/070233
§ 371 (c)(1), (2), (4) Date: Aug. 20, 2010

(87) PCT Pub. No.: WO2009/097790
PCT Pub. Date: Aug. 13, 2009

(65) Prior Publication Data
US 2010/0316806 A1 Dec. 16, 2010

(30) Foreign Application Priority Data
Jan. 31, 2008 (CN) .......................... 2008 1 0057287

(51) Int. Cl.
*B05D 3/02* (2006.01)
(52) U.S. Cl. ..................... 427/350; 427/372.2; 427/384; 427/385.5
(58) Field of Classification Search .......................... None
See application file for complete search history.

(56) References Cited

U.S. PATENT DOCUMENTS

| 4,585,571 A | 4/1986 | Bloom |
| 5,180,760 A * | 1/1993 | Oshibe et al. ................. 523/169 |
| 2004/0137155 A1 * | 7/2004 | Bernheim et al. ......... 427/385.5 |
| 2004/0194388 A1 | 10/2004 | Roche et al. |
| 2008/0164788 A1 * | 7/2008 | Riblier et al. ................. 312/116 |

FOREIGN PATENT DOCUMENTS

| JP | 61-095078 A | 5/1986 |
| JP | 61-023657 A | 2/1994 |
| JP | 07-331122 A | 12/1995 |
| JP | 2005177697 | 7/2005 |

OTHER PUBLICATIONS

Feng et al. Super-Hydrophic Surfaces: From Natural to Artificial (Dec. 17, 2002) Adv. Mater. 14(24): 1857-1860.
Gao et al. Water-Repellent Legs of Water Striders (Nov. 4, 2004) Nature 432: 36.
Tuteja et al. Designing Superoleophobic Surfaces (Dec. 7, 2007) Science 318: 1618-1622 and Supporting Online Material. Dec. 9, 2011 EP Office Action in corresponding Appln. No. 09 709 215.9-2109.
Jul. 4, 2012 EP Office Action in corresponding Appln. No. 09 709 215.9-2109.

\* cited by examiner

*Primary Examiner* — Erma Cameron
(74) *Attorney, Agent, or Firm* — Volpe and Koenig, P.C.

(57) ABSTRACT

The present invention provides an anti-frost coating, which forms a coat having a hydrophilic and hydrophobic composite structure after being applied on a substrate, and contains a hydrophobic polymer and a hydrophilic polymer. The application method of the anti-frost coating comprises: dissolving the hydrophilic polymer and the hydrophobic polymer in a solvent to form a homogeneous solution, coating the solution on a substrate to form a film, drying and curing to form an anti-frost coat with a hydrophilic and super-hydrophobic composite structure including a super-hydrophobic surface layer and a hydrophilic inner layer. Water drips can roll off easily and the dust and impurities deposited on the surface can be easily removed. The anti-frost effect is desirable.

4 Claims, 2 Drawing Sheets

ANTI-FROST COATING AND THE APPLICATION METHOD THEREOF

This application is a 35 USC §371 national phase application of PCT/CN2009/070233, which was filed Jan. 21, 2009.

FIELD OF THE INVENTION

The present invention pertains to the field of energy conservation in refrigeration and particularly relates to an anti-frost coating which can form a coat having a hydrophilic and super-hydrophobic composite structure. The coating may be applied to refrigerators, air conditioners, large cold storages and other refrigerating equipment and prevent frosting on cold surface.

BACKGROUND OF THE INVENTION

Icing is a common natural phenomenon on cold surface. In our daily life, icing on cold surface will lower the operating efficiency of refrigerating equipment and cause huge energy waste, for example: the icing of the cooling towers of power plants, the icing of automobile carburetors, the icing of heat exchangers of refrigerating plants and the icing of refrigerators. As a frost layer has certain thermal isolating effect, the frost or ice on the surface of refrigerating equipment will impair the heat transfer efficiency of the equipment and narrow or even block the airflow channel, thereby resulting in huge energy waste. Generally speaking, a frost layer 5 mm thick in a refrigerator will reduce the refrigerating efficiency by about 20% and accordingly will increase the energy consumption by 20%; more seriously, icing on cold surface may cause a serious safety accident, for example: a plane may crash due to icing on fuselage. There are two ways to solve the frosting or icing on cold surface: One way is to thaw frost through additional energy consumption. In other words, when the frost layer reaches certain thickness, the frost will be thawed or scraped off through electric heating, electric pulse, external mechanical actions etc. These methods play a certain role in removing frost, but they all additionally consume a large amount of energy. Nowadays, energy is increasingly short, so these methods undoubtedly have great limitation. The second method is to apply an anti-frost coating on the cold surface to prevent the formation of frost on the cold surface, thereby realizing the objective of preventing frosting and saving energy.

At present, anti-frost coating mainly has two mechanisms to inhibit the formation of frost: the first mechanism is to make cold surface hydrophobic, increase the contact angle of water on the cold surface and reduce the contact area between water drips and the cold surface, thereby lengthening the condensation time of water drips and playing an effect of frost inhibition; meanwhile, hydrophobic surface may also weaken the attachment of water drips to surface and reduce frost formation. On the whole, cold hydrophobic surface has certain effect on inhibiting frost formation and reducing the thickness of frost layer, but as temperature of the cold surface drops, once frost is formed on the cold surface, the hydrophobic surface will lose its anti-frost effect. The second mechanism is to make cold surface hydrophilic. Relying on its hygroscopicity, hydrophilic material can absorb the water drips condensed on cold surface in the early stage of frosting and meanwhile lower the freezing point of water, thereby inhibiting frost formation.

There are mainly the following types of hydrophilic anti-frost coatings: firstly, anti-icing/frosting agents, such as: the anti-icing/frosting agents disclosed in CN 1061987A, CN 1044947A, CN 1048053A and CN 1104674A. This type of anti-frost material mainly uses ethanol, glycerol and propylene glycol, such that it is volatile and not durable. Secondly, a hydrophilic polymer coated with propylene glycol (Refer to CN1632014A): The hydrophilic components in this type of material are also volatile, and it not suitable to be used at low temperature (<−15° C.) and high humidity (>50%) because its anti-frost effect is affected by the temperature of the cold surface and ambient humidity. Thirdly, mixture of a hydrophilic polymer and an inorganic salt (such as: NaCl and KCl) (Refer to CN 1916094A): Although this type of material may be used under the condition of low temperature and high ambient humidity, the compatibility between inorganic salts and polymer is poor; and the migration of inorganic salts in the material will result in heterogeneity of the material, thereby impairing its anti-frost effect. More importantly, hydrophilic anti-frost coating is vulnerable to contamination. Once the material surface is contaminated, the anti-frost function will disappear.

SUMMARY OF THE INVENTION

The object of the present invention is to provide an anti-frost coating which has a desirable anti-frost effect even on the cold surface of refrigerating equipment and in special ambience, and which may be used repeatedly and have good durability, contamination resistance and other advantages.

The further object of the present invention is to provide an application method of the anti-frost coating. The anti-frost coat obtained by the method of the present invention has a hydrophilic and super-hydrophobic composite structure.

The anti-frost coating of the present invention forms a coat having a hydrophilic and hydrophobic composite structure after being applied on a substrate, and contains a hydrophobic polymer and a hydrophilic polymer.

Preferably, the anti-frost coating also contains a solvent. The solvent may be an organic solvent. The organic solvent may be one or more of dioxane, benzene, N,N-dimethyl formamide (DMF), N,N-dimethyl acetamide (DMAC) and methanol.

There is no particular limitation to the content of the solvent, as long as it can meet application requirements. Preferably, the ratio of the total weight of the hydrophobic polymer and hydrophilic polymer to the weight of the solvent is (0.01-0.5):1.

The anti-frost coating of the present invention comprises the hydrophobic polymer and the hydrophilic polymer. The inner layer of the coat formed after the coating is applied on the substrate is a hydrophilic polymer layer, and the surface layer is a hydrophobic polymer layer. Based on the total weight of the hydrophobic polymer and the hydrophilic polymer, the content of the hydrophobic polymer is 20-50 wt % and the content of the hydrophilic polymer is 50-80 wt %.

According to the anti-frost coating of the present invention, the number-average molecular weight of the hydrophilic polymer may be $5\times10^3$ to $2\times10^7$ and the number-average molecular weight of the hydrophobic polymer may be $1\times10^4$ to $5\times10^6$.

The present invention differentiates hydrophobic polymers and hydrophilic polymers by judging whether the static contact angle between water and the smooth film formed by a polymer is greater than 90° or not. In the present invention, if the static contact angle between water and the smooth film formed by a polymer is not smaller than 90°, this polymer will be called a hydrophobic polymer; if the angle is smaller than 90°, it will be called a hydrophilic polymer. The smooth film refers to the film formed by dissolving the polymer in a good solvent or melting the polymer and then performing the process of film-forming. In examples of the present invention, the static contact angle of hydrophilic polymer is determined by using water as the good solvent; while the static contact angle of hydrophobic polymer is determined by melting the polymer and then forming it into a smooth film. The static contact angle between the smooth film and water is determined by using Dataphysics OCA20 Contact Angle system (Germany).

Specifically, the preferable hydrophobic polymer is one or more selected from polyacrylate, fluorine containing polyacrylate and polyolefin; or is selected from copolymer of acrylate and fluorine containing acrylate.

The preferable acrylate is one or more of the acrylates represented by the following formula (1):

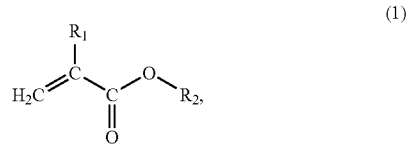

(1)

In the foregoing formula (1), $R_1$ is —H or —$CH_3$ and $R_2$ is —$C_nH_{2n+1}$, wherein n is an integer of 1 to 18 and preferably 1 to 10. For example, $R_2$ may be methyl, ethyl, propyl, isopropyl, cyclopropyl, butyl, tertiary butyl, sec-butyl, amyl, isoamyl, tertiary amyl, neo-amyl, hexyl, cyclohexyl, 2-methyl amyl, heptyl, octyl, nonyl or decyl.

The preferable fluorine containing acrylate is one or more of the fluorine containing acrylates represented by the following formula (2) and/or formula (3):

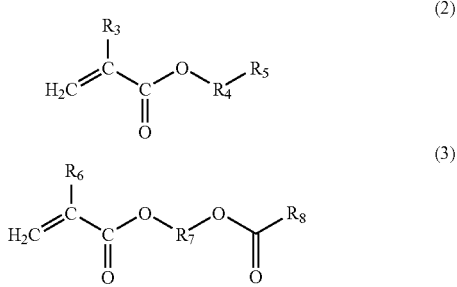

In the foregoing formula (2), $R_3$ is —H or —$CH_3$; $R_4$ is —$C_mH_{2m}$, where m is 1 or 2; and $R_5$ is —$C_aF_{2a+1}$, where a is an integer of 1 to 12 and preferably 1 to 8;

In the foregoing formula (3), $R_6$ is —H or —$CH_3$; $R_7$ is —$C_bH_{2b}$, where b is an integer of 1 to 10 and preferably 1 to 6; $R_8$ is —$C_pF_{2p+1}$, where p is an integer of 1 to 12 and preferably 1 to 10.

The polyacrylate may be a homopolymer of the foregoing acrylates or a mixture of the homopolymers.

The preferable fluorine containing polyacrylate is a homopolymer of the foregoing fluorine containing acrylates or a mixture of the homopolymers.

Specifically, the preferable acrylate is methyl acrylate, ethyl acrylate, butyl acrylate, octyl acrylate, amyl acrylate, methyl methacrylate, ethyl methacrylate, butyl methacrylate, octyl methacrylate, amyl methacrylate or their mixture.

The preferable fluorine containing acrylate is hexafluorobutyl acrylate, perfluorodecoyloxyl ethyl acrylate, perfluorooctyl acrylate, pentafluorobutyl acrylate, heptafluoroamyl acrylate, nonafluorohexyl acrylate, dodecafluorooctyl acrylate, pentafluorobutyl methacrylate, heptafluoroamyl methacrylate, nonafluorohexyl methacrylate, dodecafluorooctyl methacrylate, perfluorooctyl methacrylate, perfluorodecoyloxyl ethyl methacrylate or their mixture.

The preferable polyacrylate is poly(methyl acrylate), poly(methyl methacrylate), poly(butyl acrylate), poly(ethyl acrylate), poly(octyl acrylate), poly(amyl acrylate), poly(ethyl methacrylate), poly(butyl methacrylate), poly(octyl methacrylate), poly(amyl methacrylate) or their mixture.

The preferable fluorine containing polyacrylate is poly(hexafluorobutyl acrylate), poly(perfluorodecoyloxyl ethyl acrylate), poly(perfluorooctyl acrylate), poly(pentafluorobutyl acrylate), poly(heptafluoroamyl acrylate), poly(nonafluorohexyl acrylate), poly(dodecafluorooctyl acrylate), poly(pentafluorobutyl methacrylate), poly(heptafluoroamyl methacrylate), poly(nonafluorohexyl methacrylate), poly(dodecafluorooctyl methacrylate), poly(perfluorooctyl methacrylate), poly(perfluorodecoyloxyl ethyl methacrylate) or their mixture.

The polyolefin is polypropylene and/or polyethylene.

The hydrophilic polymer is preferably selected from sodium polyacrylate, polyacrylic acid, polymethacrylic acid, poly(-2-hydroxyethyl methacrylate), poly(-2-hydroxypropyl methacrylate), poly(glycidyl methacrylate), polyacrylamide or their mixture; or The hydrophilic polymer is preferably selected from the copolymer of two or more of sodium acrylate, acrylic acid, methacrylic acid, 2-hydroxypropyl methacrylate, glycidyl methacrylate, acrylamide and 2-hydroxyethyl methacrylate.

The application method of the anti-frost coating provided by the present invention includes: dissolving the hydrophilic polymer and the hydrophobic polymer in a solvent to form a homogeneous solution, coating the solution on the substrate, drying and curing to form a coat with a hydrophilic and super-hydrophobic composite structure consisting of a super-hydrophobic surface layer and a hydrophilic inner layer.

The hydrophilic polymer and the hydrophobic polymer are dissolved in a same solvent at 60-130° C.

The same solvent means the solvent dissolving the hydrophilic polymer and the solvent dissolving the hydrophobic polymer are same. It may be one or more of the organic solvents mentioned above.

The drying and curing temperature may be 20-60° C.

The inventors of the present invention also have discovered that drying under reduced pressure can make the hydrophobic surface layer further show super-hydrophobicity. The super-hydrophobicity refers to that the water contact angle is greater than 150°. The reduced pressure may be 10-1000 Pa.

The anti-frost coating of the present invention may be coated by a conventional method, such as: spray coating, spin coating or flowing naturally.

The anti-icing, i.e. anti-frosting principle of the coat formed after the anti-frost coating of the present invention is applied is: The hydrophobicity or super-hydrophobicity of the coat surface makes the contact angle between the condensed water drips on the cold surface and the hydrophobic surface increase (the contact angle meter used in the present invention is Dataphysics OCA20 Contact Angle system, Germany), the contact area between the water drips and the hydrophobic or super-hydrophobic surface is very small and the heat conduction is slow, thereby lengthening the time of transformation from condensed water drips to frost crystal; meanwhile, owing to the hydrophobicity or super-hydrophobicity of the hydrophobic or super-hydrophobic surface, water drips can easily roll off the hydrophobic or super-hydrophobic surface, thereby reducing the amount of the condensed water drips attached to the hydrophobic or super-hydrophobic surface, in other words, reducing the amount of the formed frost crystal. The hydrophilic polymer inner layer absorbs the condensed water drips that permeate into the inside of material. The water absorbed will exist in a form of gel so as to stop the formation of frost crystal, thereby effectively preventing icing. The synergy of the hygroscopicity of the hydrophilic polymer inner layer and the hydrophobicity or super-hydrophobicity of surface and the integration of the advantages of hydrophilic anti-frost material and hydrophobic anti-frost material achieve excellent anti-frost effect.

Compared with other anti-frost materials, the anti-frost coating of the present invention has the following advantages:
1. Contamination resistance: The surface of a hydrophilic anti-frost coating is prone to accumulating dust or other impurities and the cleaning is difficult. Surface contamination will immensely impair anti-frost effect (CN 1632014A; CN 1916094A). By contrast, the surface of the coat formed after the anti-frost coating of the present invention is applied has hydrophobicity or super-hydrophobicity and water drips can roll off easily, so the dust and impurities deposited on the surface can be easily removed.
2. Long life: The hydrophilic anti-frost coatings of the prior art achieve anti-frost effect by using the hygroscopicity of the hydrophilic components in the coatings (CN 1632014A; CN 1916094A). However, the hygroscopicity of all water absorbent materials is limited; what is more, their anti-frost effect will decrease as the absorbed water increases. When the absorbed water reaches a certain amount, the anti-frost effect will no longer exist. The short life is a common problem of the existing hydrophilic anti-frost coatings. The coat obtained after the anti-frost coating of the present invention is applied has a composite structure consisting of a hydrophobic or super-hydrophobic surface layer and a hydrophilic inner layer, and the hydrophobicity or super-hydrophobicity of the surface makes most of the condensed water drips roll off the surface, so few water drips permeate into the inner layer, thereby lengthening the life of the hydrophilic inner layer and also lengthening the life of the anti-frost coating.
3. No volatile components: The main anti-frost components of the existing anti-icing/frosting agents (CN 1061987A; CN 1044947A; CN 1048053A; CN 1104674A) and anti-frost coatings (CN 1632014A) are volatile ethanol, propylene glycol and glycerol. The volatilization of alcohols will adversely affect the anti-frost effect and durability of the coats. The anti-frost coating described in the present invention is a mixture of different components and forms a composite structure consisting of a hydrophobic or super-hydrophobic surface layer and a hydrophilic inner layer. During the preparation, no volatile components are introduced, so the coat durability is improved.
4. Good anti-frost effect: Ordinary hydrophobic anti-frost coatings play a limited role in retarding icing on cold surface (CN 1880396A); while after the anti-frost coating of the present invention is applied on substrate surface, a super-hydrophobic surface will be formed, retard the formation of ice nuclei and reduce the thickness of frost. The present invention integrates the anti-frost advantages of hydrophobic or super-hydrophobic surface layer and hydrophilic inner layer and enhances anti-frost effect through the synergistic action of them.

DETAILED DESCRIPTION OF THE EMBODIMENTS

Figure 1:
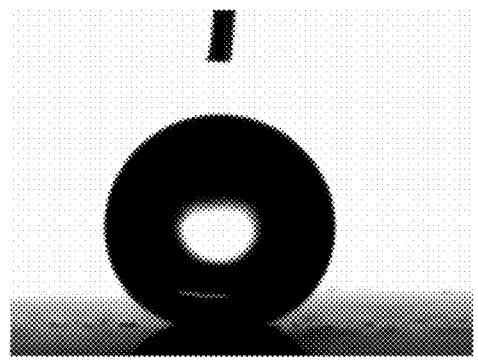
FIG. 1 is a photo showing the contact angle formed after the anti-frost coating is applied on aluminum sheet surface in Example 1 of the present invention. As shown in the photo, the static contact angle reaches 159°.

The examples below will further explain the present invention.

Example 1

1. Preparation of a Hydrophilic Polymer

Compositions: Sodium acrylate 20 g and 2-hydroxyethyl methacrylate 10 g.

Mix monomers sodium acrylate 20 g and 2-hydroxyethyl methacrylate 10 g to obtain mixed monomer A1. Add 160 g of water into a container equipped with a reflux condenser, a stirrer and a dropping funnel, add 21 g of the mixed monomer A1 at first under the atmosphere of nitrogen, raise temperature to 60° C., add 0.25 g of ammonium persulphate as initiator and 0.2 g of sodium bicarbonate as pH regulator, and in 10 min add the remaining mixed monomer A1; after reacting for 4 hours, add 0.05 g of ammonium persulphate as initiator, continue to react for 2 hours, dewater the products after completion of the reaction, and vacuum dry to obtain a hydrophilic polymer. The hydrophilic polymer has a number-average molecular weight measured gel permeation chromatography (GPC) of $5.6 \times 10^5$. The static contact angle between water and the smooth film obtained by using water as solvent is smaller than 5°.

2. Preparation of a Hydrophobic Polymer

Composition: Perfluorodecoyloxyl ethyl acrylate 10 g, methyl methacrylate 20 g, hexafluorobutyl acrylate 15 g and butyl acrylate 10 g.

Mix perfluorodecoyloxyl ethyl acrylate 10 g, methyl methacrylate 20 g, hexafluorobutyl acrylate 15 g and butyl acrylate 10 g to obtain mixed monomer B1. Add 60 ml of butyl acetate into a container equipped with a reflux condenser, a stirrer and a dropping funnel, add 31.5 g of monomer B1 at first under the atmosphere of nitrogen, raise temperature to 70° C., add 0.1 g of benzoyl peroxide as initiator, and in 10 min add the remaining mixed monomer B1; after reacting for 4 hours, add 0.05 g of benzoyl peroxide as initiator, continue to react for 2 h, remove solvent from the product after completion of the reaction, and vacuum dry to obtain a hydrophobic polymer. The hydrophobic polymer has a number-average molecular weight measured by GPC of $9.7 \times 10^4$. The static contact angle between its smooth film and water is 96.4°.

3. Application of the Anti-Frost Coating and the Adjustment of Hydrophilic/Super-Hydrophobic Composite Structure Weigh 30 g of the foregoing hydrophilic polymer and 10 g of the foregoing hydrophobic polymer, mix them well, dissolve the mixture in N,N-dimethyl formamide at 70° C. to obtain an anti-frost coating with 1 wt % total concentration of hydrophilic polymer and hydrophobic polymer, and spray this anti-frost coating onto aluminum sheet surface with a spray gun. Dry and cure the coated aluminum sheet at 30° C. under 10 Pa, to obtain an aluminum sheet with anti-frost coat wherein the inner layer of the anti-frost coat is a hydrophilic sodium acrylate/2-hydroxyethyl methacrylate copolymer, and the surface layer is a hydrophobic perfluorodecoyloxyl ethyl acrylate/methyl methacrylate/hexafluorobutyl acrylate/butyl acrylate copolymer. The total thickness of the anti-frost coat is 0.4 mm.

4. Effect Test of the Anti-Frost Coating

1) Testing Equipment

The contact angle meter is Dataphysics OCA20 Contact Angle system (Germany); the cooling system comprises a low-temperature intelligent constant-temperature recirculating tank (Beijing Oriental Elite X30-D) and a heat exchanger; the multi-channel monitoring device is made by Beijing Zhongyi Huashi Technology Co., Ltd.

2) Testing Method

Put the foregoing aluminum sheet covered with an anti-frost coat between the fins of the heat exchanger, and use a multi-channel monitoring device connected with a platinum resistor to measure the temperature of aluminum sheet surface and frost layer; record frosting process with the digital camera, CCD, microscopic system, image processing software and computer of the foregoing contact angle meter.

3) Measurement Result

FIG. 1 is a photo showing the static contact angle of water on an aluminum sheet covered with an anti-frost coat. The contact angle is 159°. From the photo, it could be seen that the aluminum sheet covered with an anti-frost coat shows a super-hydrophobic property.

Figure 2A:
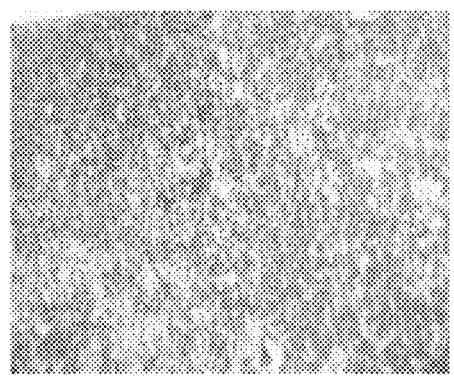
FIG. 2A and FIG. 2B are photos respectively showing the icing effects in 4 h under the condition of ambient temperature 20° C., aluminum surface temperature −15° C. and ambient humidity 50% without or with anti-frost coating in Example 1 of the present invention.
Figure 2B:
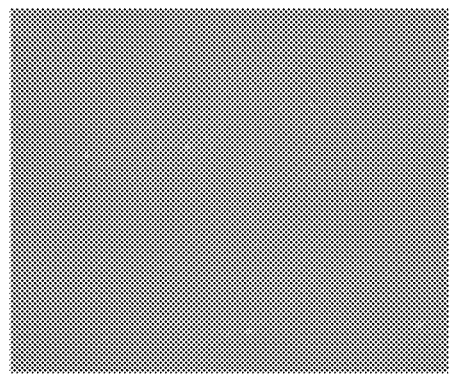

FIG. 2A and FIG. 2B show the comparison result of the measured frosting results of the aluminum sheet covered without or with an anti-frost coat when ambient humidity is maintained at 40% and wall surface temperature is −15° C. FIG. 2A shows an aluminum sheet without a coat. FIG. 2B shows an aluminum sheet covered with an anti-frost coat. The two photos indicate that 4 h later, the surface of the aluminum sheet without an anti-frost coat is frosted obviously and the thickness of the frost layer reaches 3.15 mm, while on the surface of the aluminum sheet with an anti-frost coat, there is almost no ice crystal, particularly no growth of a vast frost layer.

The above results indicate the anti-frost coating described in the present invention effectively inhibit the growth of frost layer, the frost layer does not appear within 4 h when wall surface temperature is greater than −15° C. and ambient humidity is smaller than 50%, and its anti-frost effect is obvious.

Example 2

1. Commercial polyacrylic acid (number-average molecular weight is $1.01\times10^7$) and poly(2-hydroxyethyl methacrylate) (number-average molecular weight is $1.3\times10^5$) are purchased. The hydrophilic polymer is a mixture of polyacrylic acid and poly(2-hydroxyethyl methacrylate). The static contact angle between the smooth film prepared from this mixture and water is smaller than 5°.

2. Preparation of a hydrophobic polymer

Mix 15 g of hexafluorobutyl acrylate and 20 g of methyl methacrylate to obtain a mixed monomer B2.

Add 60 ml of butyl acetate into a container equipped with a reflux condenser, a stirrer and a dropping funnel, add 24.5 g of monomer B2 at first under the atmosphere of nitrogen, raise temperature to 70° C., add 0.07 g of benzoyl peroxide as initiator, and in 10 min add the remaining mixed monomer B2; after reacting for 4 hours, add 0.03 g of benzoyl peroxide as initiator, continue to react for 2 h, remove the solvent from the product after completion of the reaction, and vacuum dry to obtain a hydrophobic polymer. The hydrophobic polymer has a number-average molecular weight measured by GPC of $8.4\times10^4$. The static contact angle between the smooth film prepared from this hydrophobic copolymer and water is 94.8°.

3. Application of the anti-frost coating and the adjustment of hydrophilic/super-hydrophobic composite structure Weigh 20 g of polyacrylic acid, 20 g of poly(-2-hydroxyethyl methacrylate) and 10 g of the hydrophobic polymer, mix them well, dissolve the mixture in the mixed solvent of DMF and dioxane (v/v 3:1) at 80° C. to obtain an anti-frost coating containing 3 wt % polymer, cool it to 60° C. and then spray it on the surface of an aluminum sheet. Dry and cure the coated aluminum sheet at 20° C. and under 100 Pa. An aluminum sheet with an anti-frost coat is obtained. The inner layer of the anti-frost coat is the mixture of hydrophilic polyacrylic acid/poly(-2-hydroxyethyl methacrylate), and the surface layer is a hydrophobic methyl methacrylate/hexafluorobutyl acrylate copolymer. The total thickness of the anti-frost coat is 0.6 mm. The static contact angle between the anti-frost coat and water is 155.6°. The testing process is same as that described in Example 1.

Figure 3:
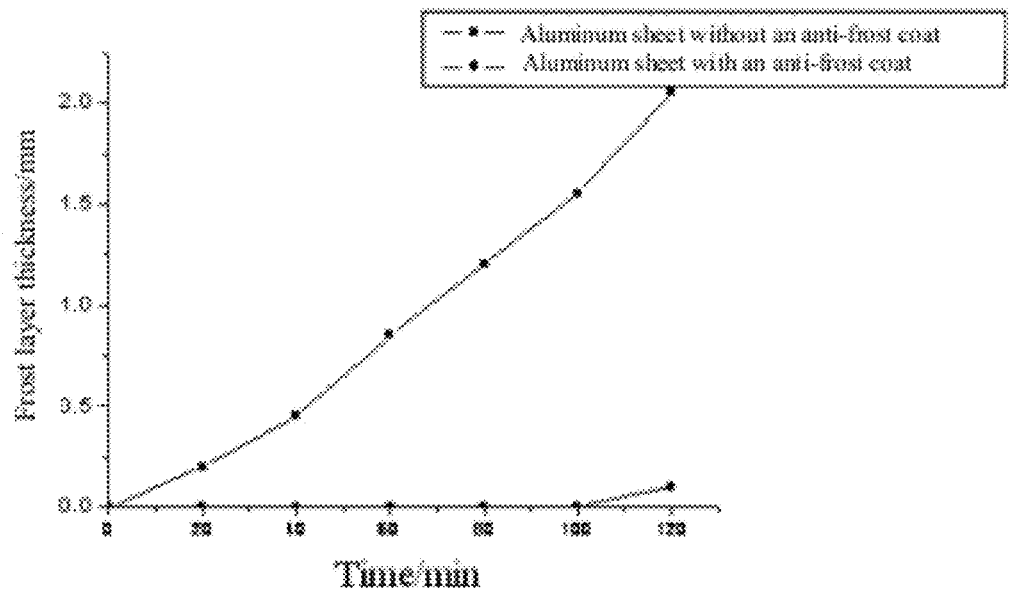
FIG. 3 shows the relation between time and the thickness of the frost layer on the surface of an aluminum sheet with or without anti-frost coating in Example 2 of the present invention.

4. Measurement result of frost layer thickness: 2 h later under the condition of laboratory ambient temperature 18° C., aluminum sheet surface temperature −15.3° C. and ambient humidity 50%, the frost layer on the surface of the aluminum sheet without an anti-frost coating is 2.05 mm thick, and the frost layer on the surface of the aluminum sheet with an anti-frost coating is 0.22 mm thick (See FIG. 3).

Example 3

1. Commercial polyacrylic acid is chosen as a hydrophilic polymer. The static contact angle between its smooth film and water is smaller than 5°.

2. Commercial polypropylene is chosen as a hydrophobic polymer. The static contact angle between its smooth film and water is 102.5°.

3. Application of the anti-frost coating and the adjustment of hydrophilic/super-hydrophobic composite structure Weigh 20 g of polyacrylic acid (number-average molecular weight is $8\times10^6$) and 10 g of polypropylene (number-average molecular weight is $4.95\times10^6$), mix them well, dissolve the mixture in the mixed solvent of dioxane and xylene (v/v 2:1) at 120° C. to obtain an anti-frost coating containing 10 wt % polymer and apply the coating on the surface of an aluminum sheet by natural flowing technique. Dry and cure the coated aluminum sheet at 40° C. under 1000 Pa. An aluminum sheet with an anti-frost coat is obtained. The inner layer of the anti-frost coat is a hydrophilic polyacrylic acid, and the surface layer is a hydrophobic polypropylene. The total thickness of the anti-frost coat is 0.82 mm. The static contact angle between the anti-frost coat and water is 158.2°. The testing process is same as that described in Example 1.

Figure 4:
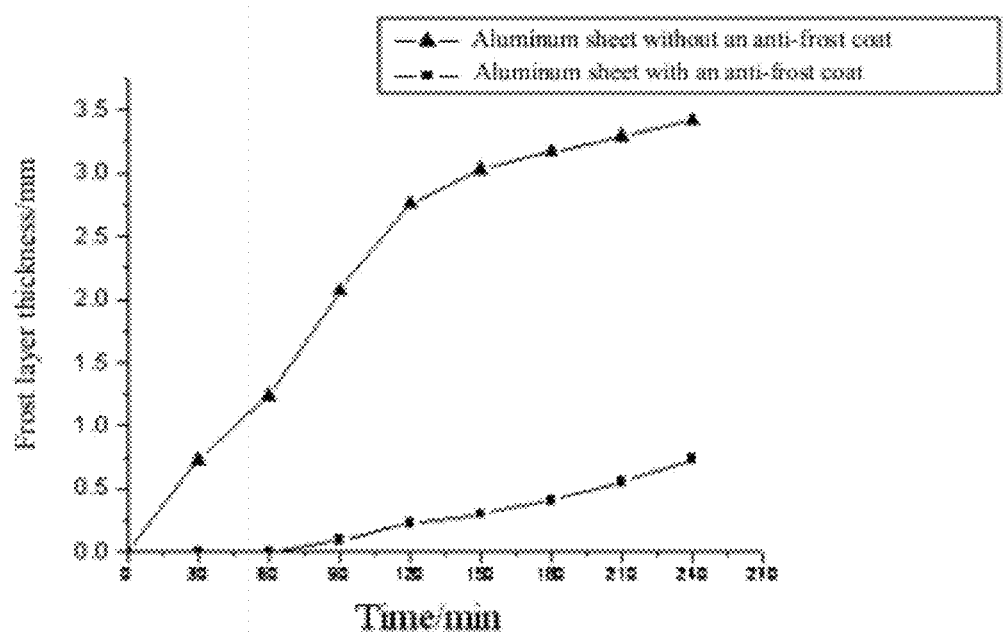
FIG. 4 shows the relation between time and the thickness of the frost layer on the surface of an aluminum sheet with or without anti-frost coating in Example 3 of the present invention.

4. Measurement result of frost layer thickness: 4 h later under the condition of laboratory ambient temperature 19° C., aluminum sheet surface temperature −14.8° C. and ambient humidity 50%, the frost layer on the surface of the aluminum sheet without an anti-frost coating is 3.42 mm thick, and the frost layer on the surface of the aluminum sheet with an anti-frost coating is 0.74 mm thick (See FIG. 4).

Example 4

1. Preparation of a hydrophilic polymer

Composition: Acrylic acid 10 g, sodium acrylate 15 g and 2-hydroxyethyl methacrylate 10 g.

Mix acrylic acid 10 g, sodium acrylate 15 g and 2-hydroxyethyl methacrylate 10 g to obtain mixed monomer A4. Add 200 g of water into a container equipped with a reflux condenser, a stirrer and a dropping funnel, add 24.5 g of monomer A4 at first under the atmosphere of nitrogen, raise temperature to 60, add 0.3 g of ammonium persulphate as initiator and 0.22 g of sodium bicarbonate as pH regulator, and in 10 min add the remaining mixed monomer A4; after reacting for 4 hours, add 0.05 g of ammonium persulphate as initiator, continue to react for 2 h, dewater the product after completion of the reaction, and vacuum dry to obtain a hydrophilic polymer. The hydrophilic polymer has a number-average molecular weight measure by GPC of $5.2 \times 10^3$.

The static contact angle between its smooth film and water is smaller than 5°.

2. Commercial polymethyl methacrylate is selected. The hydrophobic polymer is a mixture of polymethyl methacrylate and poly(hexafluorobutyl acrylate).

Preparation of polyhexafluorobutyl acrylate:

Add 30 ml of butyl acetate into a container equipped with a reflux condenser, a stirrer and a dropping funnel, add 15 g of monomer hexafluorobutyl acrylate under the atmosphere of nitrogen, raise temperature to 70, add 0.1 g of benzoyl peroxide as initiator, after reacting for 30 min, add 10 g of monomer hexafluorobutyl acrylate in 10 min; add 0.05 g of benzoyl peroxide as initiator after reacting for 4 hours, continue to react for 2 h, remove the solvent from the product after completion of the reaction, and vacuum dry to obtain hydrophobic poly(hexafluorobutyl acrylate). The hydrophobic polymer has a number-average molecular weight measured by GPC of $1.0 \times 10^4$. The static contact angle between the smooth film of this hydrophilic polymer and water is 97.2°.

3. Application of the anti-frost coating and the adjustment of hydrophilic/super-hydrophobic composite structure Weigh 30 g of the foregoing hydrophilic polymer, 10 g of polymethyl methacrylate (number-average molecular weight is $4.3 \times 10^6$) and 5 g of the polyhexafluorobutyl acrylate prepared above, mix them well, dissolve the mixture in a mixed solvent of N,N-dimethyl acetamide and methanol (v/v 1:3) at 70 to obtain a solution containing 10 wt % polymer and apply the anti-frost coating on an aluminum sheet surface by spin coating method (spin speed: 3000 rps). Dry and cure the coated aluminum sheet at 50° C. under 500 Pa. An aluminum sheet with anti-frost coat is obtained. The inner layer of the anti-frost coat is a sodium acrylate/2-hydroxyethyl methacrylate/acrylic acid copolymer, and the surface layer is a hydrophobic mixture of polymethyl methacrylate and poly(hexafluorobutyl acrylate). The total thickness of the anti-frost coat is 0.35 mm. The static contact angle between the anti-frost coat and water is 153.8°. The testing process is same as that described in Example 1.

4. Measurement result of frost layer thickness: 2 h later under the condition of laboratory ambient temperature 20° C., aluminum sheet surface temperature −16° C. and ambient humidity 40%, the frost layer on the surface of the aluminum sheet without an anti-frost coating is 2.31 mm thick, and the frost layer on the surface of the aluminum sheet with an anti-frost coating is 0.33 mm thick.

Example 5

1. The preparation of a hydrophilic polymer is same as that in Example 1.

2. Commercial poly(methyl methacrylate) and poly(butyl methacrylate) are chosen. The hydrophobic polymer is a mixture of poly(methyl methacrylate), poly(butyl acrylate), poly (hexafluorobutyl acrylate) and poly(perfluorodecoyloxyl ethyl acrylate).

The preparation of poly(hexafluorobutyl acrylate) is same as that in Example 4.

Preparation of poly(perfluorodecoyloxyl ethyl acrylate):

Add 30 ml of butyl acetate into a container equipped with a reflux condenser, a stirrer and a dropping funnel, add 10 g of monomer perfluorodecoyloxyl ethyl acrylate under the atmosphere of nitrogen, raise temperature to 80° C., add 0.1 g of benzoyl peroxide as initiator, after reacting for 30 min, add 5 g of monomer perfluorodecoyloxyl ethyl acrylate in 10 min; add 0.05 g of initiator benzoyl peroxide after reacting for 4 hours, continue to react for 2 h, remove the solvent from the product after completion of the reaction, and vacuum dry to obtain a hydrophobic poly(perfluorodecoyloxyl ethyl acrylate). The hydrophobic polymer has a number-average molecular weight measured by GPC of $2.6 \times 10^4$. The static contact angle between the smooth film prepared from this hydrophobic polymer and water is 105.4°.

3. Preparation of an anti-frost material covered with an anti-frost coat

Weigh 30 g of the foregoing hydrophilic polymer, 5 g of poly(methyl methacrylate) (number-average molecular weight is $4.3 \times 10^6$), 2 g of poly(butyl acrylate) (number-average molecular weight is $6.4 \times 10^4$), 2.5 g of poly(hexafluorobutyl acrylate) and 2.5 g of poly(perfluorodecoyloxyl ethyl acrylate), mix them well, dissolve the mixture in a mixed solvent of N,N-dimethyl acetamide and methanol (v/v 1:4) at 80 to obtain a solution containing 10 wt % polymer and apply it on aluminum sheet surface by natural flowing method. Dry and cure the coated aluminum sheet at 60° C. under 750 Pa. An aluminum sheet with anti-frost coat is obtained. The inner layer of the anti-frost coat is a hydrophilic sodium acrylate/ 2-hydroxyethyl methacrylate copolymer, and the surface layer is a hydrophobic mixture of poly(methyl methacrylate), poly(butyl acrylate), poly(hexafluorobutyl acrylate) and poly (perfluorodecoyloxyl ethyl acrylate). The total thickness of the anti-frost coat is 0.72 mm. The static contact angle between the anti-frost coat and water is 156.2°. The testing process is same as that described in Example 1.

4. Measurement result of frost layer thickness: 2 h later under the condition of laboratory ambient temperature 18.2° C., aluminum sheet surface temperature −14.4° C. and ambient humidity 55%, the frost layer on the surface of the aluminum sheet without an anti-frost coating is 2.51 mm thick, and the frost layer on the surface of the aluminum sheet with an anti-frost coating is 0.42 mm thick.

The foregoing examples indicate the anti-frost coating described in the present invention has a desirable anti-frost effect and may be applied to refrigerating industry and prevent frost of outdoor air conditioners in northern China where the temperature is low.

What is claimed is:

1. An application method of an anti-frost coating, comprising: dissolving a hydrophilic polymer and a hydrophobic polymer in an organic solvent to form a homogeneous solution, coating the homogeneous solution on a substrate to form a film, drying and curing the film to form the anti-frost coat with a hydrophilic and super-hydrophobic composite structure including a super-hydrophobic surface layer and a hydrophilic inner layer; wherein
- the hydrophobic polymer is one of polyacrylate, polyolefin and fluorine containing polyacrylate or their mixture; or a copolymer of acrylate and fluorine containing acrylate;
- the hydrophilic polymer is sodium polyacrylate, polyacrylic acid, poly(2-hydroxypropyl methacrylate) or their mixture; or a copolymer of two or more of sodium acrylate, acrylic acid and 2-hydroxyethyl methacrylate;
- the organic solvent is one or more of dioxane, xylene, N,N-dimethyl formamide, N,N-dimethyl acetamide and methanol; and
- the drying and curing pressure is 10-1000 Pa, the super-hydrophobic refers to a water contact angle greater than 150°.

2. The method according to claim 1, wherein the hydrophilic polymer and the hydrophobic polymer are dissolved in a same organic solvent at 60-130° C.

3. The method according to claim 1, wherein the drying and curing temperature is 20-60° C.

4. The method according to claim 1, the acrylate is butyl acrylate, methyl methacrylate, or their mixture;
- the fluorine containing acrylate is hexafluorobutyl acrylate, perfluorodecoyloxyl ethyl acrylate, or their mixture;
- the polyacrylate is poly(methyl acrylate), poly(methyl methacrylate), poly(butyl acrylate) or their mixture;
- the fluorine containing polyacrylate is poly(hexafluorobutyl acrylate), poly(perfluorodecoyloxyl ethyl acrylate) or their mixture; and
- the polyolefin is polypropylene.

* * * * *